United States Patent
Rahy et al.

(10) Patent No.: US 10,787,605 B2
(45) Date of Patent: Sep. 29, 2020

(54) METHODS AND THERMALLY STABLE AQUEOUS BORATE-BASED CROSS-LINKING SUSPENSIONS FOR TREATMENT OF SUBTERRANEAN FORMATIONS

(71) Applicant: Univar USA Inc., Downers Grove, IL (US)

(72) Inventors: Abdelaziz Rahy, Waxahachie, TX (US); DeWitt Knox, Mansfield, TX (US); Mohand Melbouci, Wilmington, DE (US)

(73) Assignee: Univar USA Inc., Downers Grove, IL (US)

( * ) Notice: Subject to any disclaimer, the term of this patent is extended or adjusted under 35 U.S.C. 154(b) by 0 days.

(21) Appl. No.: 16/092,739

(22) PCT Filed: Apr. 10, 2017

(86) PCT No.: PCT/US2017/026867
§ 371 (c)(1),
(2) Date: Oct. 10, 2018

(87) PCT Pub. No.: WO2017/180534
PCT Pub. Date: Oct. 19, 2017

(65) Prior Publication Data
US 2019/0161671 A1 May 30, 2019

Related U.S. Application Data

(60) Provisional application No. 62/322,752, filed on Apr. 14, 2016.

(51) Int. Cl.
| | | |
|---|---|---|
| *E21B 43/26* | (2006.01) | |
| *C09K 8/68* | (2006.01) | |
| *C09K 8/90* | (2006.01) | |
| *C09K 8/88* | (2006.01) | |

(52) U.S. Cl.
CPC ............... *C09K 8/685* (2013.01); *C09K 8/68* (2013.01); *C09K 8/887* (2013.01); *C09K 8/90* (2013.01); *E21B 43/26* (2013.01)

(58) Field of Classification Search
None
See application file for complete search history.

(56) References Cited

U.S. PATENT DOCUMENTS

| | | |
|---|---|---|
| 4,619,776 A | 10/1986 | Mondshine |
| 5,145,590 A | 9/1992 | Dawson |
| 5,407,475 A | 4/1995 | Lukach et al. |
| 6,793,018 B2 | 9/2004 | Dawson et al. |
| 6,936,575 B2 | 8/2005 | Dobson, Jr. et al. |
| 7,048,096 B2 | 8/2006 | Harris, Jr. et al. |

(Continued)

FOREIGN PATENT DOCUMENTS

| | | |
|---|---|---|
| WO | 2014133853 | 9/2014 |
| WO | 2016183181 | 11/2016 |

*Primary Examiner* — Andrew Sue-Ako
(74) *Attorney, Agent, or Firm* — Barnes & Thornburg LLP

(57) ABSTRACT

An aqueous cross-linking suspension composition having brine, water-soluble suspending agent and borate cross-linker in a single package and methods for using the package composition for increasing the efficiency of fracturing subterranean formations and effectively delivering borate cross-linkers.

6 Claims, 2 Drawing Sheets

(56) References Cited

U.S. PATENT DOCUMENTS

| | | |
|---|---|---|
| 8,293,687 B2 | 10/2012 | Giffin |
| 2007/0135312 A1 | 6/2007 | Melbouci |
| 2007/0281871 A1 | 12/2007 | Kesavan et al. |
| 2008/0220993 A1 | 9/2008 | Melbouci |
| 2009/0192051 A1 | 7/2009 | Carman |
| 2010/0048429 A1 | 2/2010 | Dobson, Jr. et al. |
| 2012/0012325 A1 | 1/2012 | Carman |
| 2012/0220503 A1 | 8/2012 | Sanchez Reyes et al. |
| 2013/0213657 A1 | 8/2013 | Dobson, Jr. et al. |
| 2013/0228335 A1 | 9/2013 | Dobson et al. |
| 2014/0034323 A1 | 2/2014 | Dobson, Jr. et al. |
| 2014/0174742 A1 | 6/2014 | Mirakyan et al. |
| 2014/0364343 A1 | 11/2014 | Nelson et al. |
| 2015/0013983 A1 | 1/2015 | Alwattari |
| 2016/0326426 A1* | 11/2016 | Rahy ................. C09K 8/685 |
| 2016/0333255 A1* | 11/2016 | Shchepelina .......... C09K 8/685 |

\* cited by examiner

METHODS AND THERMALLY STABLE AQUEOUS BORATE-BASED CROSS-LINKING SUSPENSIONS FOR TREATMENT OF SUBTERRANEAN FORMATIONS

CROSS-REFERENCE TO RELATED APPLICATIONS

Not applicable

BACKGROUND OF THE INVENTION

Field of the Invention

The inventions disclosed and taught herein relate generally to well treatment fluid compositions and methods, and more specifically are related to compositions and methods for delivery of borate-containing agents with enhanced thermal stability at high operating temperatures.

Description of Related Art

To recover hydrocarbons from subterranean formations, it is common to hydraulically fracture the hydrocarbon-bearing formation to provide flow channels to facilitate production of the hydrocarbons to the wellbore. Fracturing fluids typically comprise a water or oil-base fluid incorporating a polymeric thickening agent. The polymeric thickening agent helps to control leak-off of the fracturing fluid into the formation, aids in the transfer of hydraulic fracturing pressure to the rock surfaces and, primarily permits the suspension of particulate proppant materials which remain in place within the fracture when fracturing pressure is released.

Typical polymeric thickening agents for use in fracturing fluids are polysaccharide polymers. To increase the viscosity and thus the proppant carrying capacity and to increase the high temperature stability of the fracturing fluid, crosslinking of polymers is also commonly practiced. Typical cross-linking agents comprise soluble boron, zirconium or titanium compounds. These metal ions provide for crosslinking or tying together of the polymer chains to increase the viscosity and improve the rheology of the fracturing fluid.

Of necessity, fracturing fluids are prepared on the surface and then pumped through tubing in the wellbore to the hydrocarbon-bearing subterranean formation. While high viscosity is a desirable characteristic of a fluid within the formation in order to efficiently transfer fracturing pressures to the rock as well as to reduce fluid leak-off, larger amounts of hydraulic horsepower are required to pump such high viscosity fluids through the well tubing to the formation. In order to reduce the friction pressure, various methods of delaying the crosslinking of the polymers in a fracturing fluid have been developed. This allows the pumping of a relatively less viscous fracturing fluid having relatively low friction pressures within the well tubing, with crosslinking being effected at or near the subterranean formation so that the advantageous properties of the thickened crosslinked fluid are available at the rock face.

Use of various combination treatments of chemical additives is well-known in oilfield operations. The chemicals may be introduced into the fracturing fluid individually or in combination, and may be in solid, aqueous or non-aqueous liquid, or suspension form. The selection of the chemicals and how they are introduced will depend upon the particular conditions of the wellbore to be treated. Examples include treatment of subterranean formations by adding solids to the wellbore including solid-supported crosslinkers as disclosed in U.S. Patent Publication No. 2015/0013983; a self-hydrating, self-crosslinking dry composition of guar and borate to prepare a hydrated, cross-linked fracturing fluid as disclosed in U.S. Patent Publication No. 2007/0281871; and a thio-sulfate, guar and boron-compound containing additives package is disclosed in U.S. Pat. No. 8,293,687.

Ulexite, also known as hydrated sodium calcium borate hydroxide ($NaCaB_5O_6(OH)_6 \cdot 5H_2O$), is widely used as a delayed boron cross-linker, particularly for guar and hydroxypropyl guar-based fracturing fluids. For example, a method for treating a fracturing fluid to maintain a stable cross-link viscosity with polymers such as guar gum and boron compounds capable of cross-linking with the polymer including ulexite is disclosed in U.S Patent Publication No. 2014/0364343.

For easy handling in oil and gas well rigs and convenient storage for offshore operations, additives may also be utilized in liquid form. A variety of environmentally-acceptable solvent-based polymer suspensions have been developed which are based either on mineral oil or glycols. For instance, non-aqueous borate-containing suspensions for fracturing subterranean formations are disclosed in U.S. Pat. No. 7,084,096. Such suspensions still face some use restrictions, as they do not fully meet the regulatory requirements with regard to aquatic toxicity, biodegradability and bio-accumulation.

Moreover, such concentrates can be expensive and difficult to pump due to high viscosity or high abrasiveness to the pump.

Chemicals may also be used to treat wellbores as aqueous solutions. When the hydraulic fracturing fluid is aqueous, temperature stability may be enhanced with additives including guar and borates (U.S. Pat. No. 4,619,776). Concentrated aqueous solutions have been made for the cross-linking of polymers including ulexite crosslinking agents, chelating agents and guar gum viscosifying agents (U.S. Patent Publication No. 2012/0220503).

Sodium thiosulfate is well-known as a thermal stabilizing agent that is widely used in various oilfield applications (U.S. Patent Publication No. 2008/0220993 and U.S. Pat. No. 5,407,475). Aqueous suspensions for oilfield additives have also been utilized including ulexite (U.S. Pat. No. 6,936,575 and U.S. Patent Publication No. 2014/0034323); and cellulose ethers (U.S. Patent Publication No. 2007/0135312). A system for controllably cross-linking aqueous crosslinkable organic polymer solutions such as guar with sparingly soluble borates such as ulexite has been disclosed in U.S. Patent Publication Nos. 2010/0048429 and 2013/0228335.

However, use of an aqueous based concentrate may be unacceptable at low temperatures as such solutions may become more viscous, such that they become non-pourable or solidify.

When the drilling occurs at high temperatures, it is necessary to make certain adjustments in order to insure that additives retain their intended functions in the drilling fluid. To that end, a method for improving high-temperature stability of borated, guar containing fracturing fluids with aldehyde delay additives is disclosed in U.S. Pat. No. 5,145,590; and phenothiazine stabilizers for high temperature well treatment fluids containing polyvinyl alcohol, sodium thiosulfate and guar are disclosed in U.S. Patent Publication Nos. 2009/0192051 and 2012/0012325.

Additives including guar, ulexite, thiosulfate and polyvinyl alcohol are known as additives for well treatment fluids (U.S. Pat. No. 6,793,018). However, conventional additive treatment methods involve separately dosing additives and do not utilize a water-soluble suspending agent and a borate cross-linker together in the same package. The efficiency of such a pairing of additives in a single package for delivery to the wellbore was not previously known.

The search for oil and gas well products which are entirely composed of PLONOR (pose little or no risk to the environment) components is ongoing, as all existing products which do not meet the requirements for PLONOR components will be placed on a phase-out list, and must be replaced as soon as "green" additives are available.

Therefore, there is still a need for additive packages which can be conveniently transported and delivered to the drilling fluids of subterranean formations under high temperature conditions.

BRIEF SUMMARY OF THE INVENTION

A stable aqueous and environmentally acceptable package for delivery of borate-based cross-linking agents, and method for using the package in fracturing subterranean formations is described. Ulexite suspended in thiosulfate brine, and stabilized with a small amount of a water-soluble polymer in a single package efficiently delivers cross-linking capability during fracturing operations. The formulation of the package can be tailored to optimize cross-linking time required for particular conditions.

DETAILED DESCRIPTION OF THE INVENTION

Figure 1:
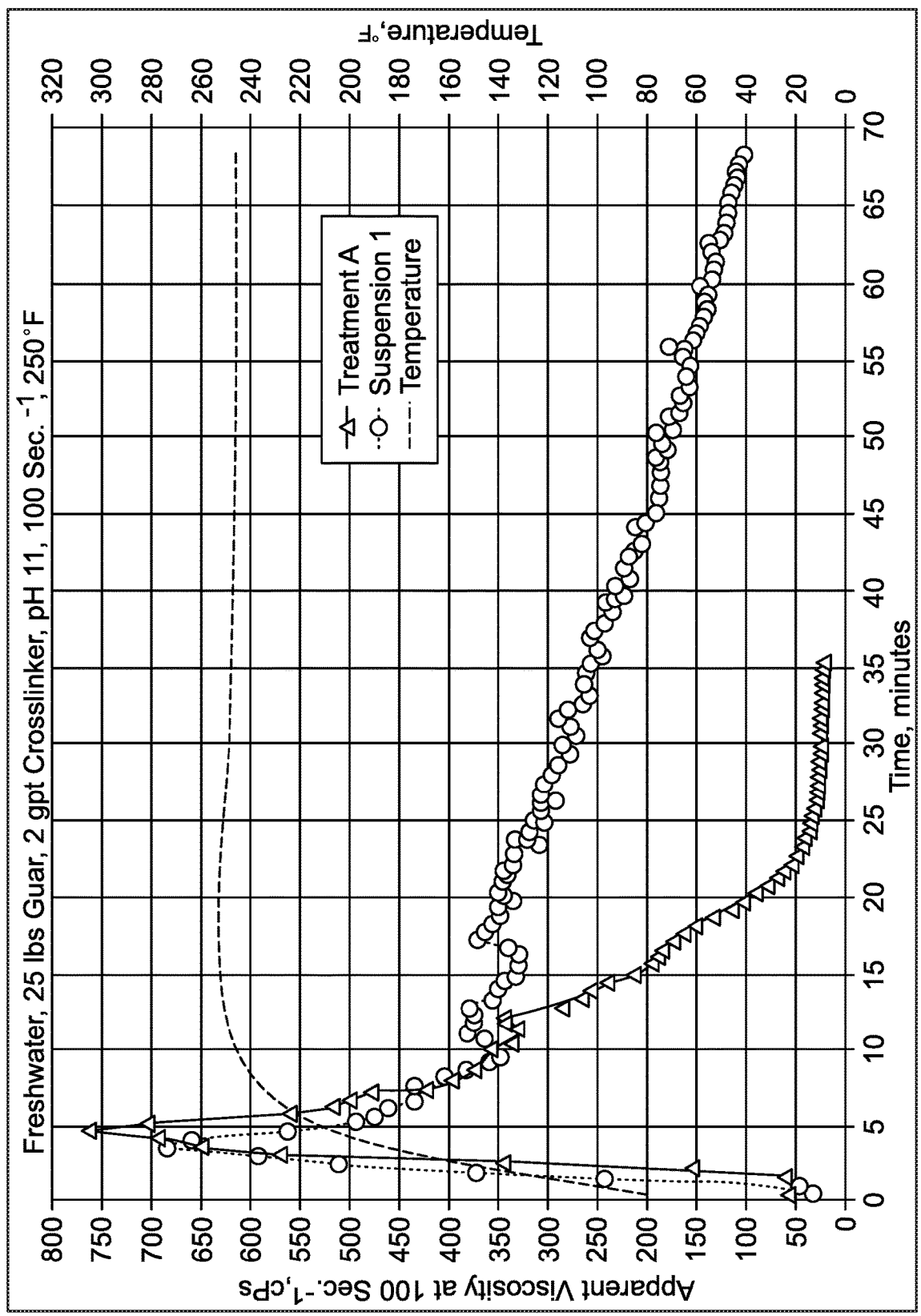
FIG. 1 is a chart comparing viscosity results of Suspension 1 to a conventional treatment, A, over time

The present invention is a combination of a borate-based cross-linker, such as ulexite, suspended in thiosulfate brine, and stabilized with a small amount of a water-soluble polymer in a single package, which can efficiently deliver cross-linking capability during fracturing operations. The package has excellent flow properties, excellent freeze/thaw stability and also thermally stabilizes the gellants normally used in oilfield operations. By using a single package for a combination of these additives, there is no need to add several different additives at different locations and different times to achieve a particular effect. The single pre-blended package considerably simplifies the operation of delivery of oilfield additives. Moreover, it provides a cost savings by decreasing the labor involved and also by decreasing transportation costs in terms of number of containers necessary to deliver additives utilized at a site. Minimization of containers of additives to be conveyed to a site is particularly important when the operation is off-shore.

More particularly, the cross-linking efficiency of the suspension package can be maintained at above 200 cPS for at least one hour at 250 degrees F. with two gallons per thousand gallons of the suspension package. Thermal stability demonstrated by the package is a minimum of 50% of original viscosity after one hour at 250 degrees F.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a liquid that can dissolve a solid, liquid or gas. Non-limiting examples of solvents are silicones, organic compounds, water, alcohols, ionic liquids and supercritical fluids.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries or muds used in drilling operations downhole, such as the formation of the wellbore.

As used herein, the term "fracturing fluid" refers to fluids or slurries used downhole during fracturing operations.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing or screens. In some examples, a subterranean material can be any below-ground area that can produce liquid or gaseous petroleum materials, water or any section below ground in fluid contact therewith.

As used herein, the term "water" includes fresh water, produced water or seawater. The suspension package may typically have 40-80% water.

The crosslinking agent used to form the aqueous crosslinking suspension composition includes, but is not limited to, water soluble borate releasing compounds. Examples of such crosslinking agents include borate ion releasing compounds such as boric acid, boric oxide, pyroboric acid, metaboric acid, borax, sodium tetraborate, ulexite, colemanite, probertite, gowerite, frolovite, meyerhofferite, inyoite, pricerite, tertschite, ginorite, hydroboracite, inderborite, or mixtures thereof.

The crosslinking agent can further comprise polyvalent metal cation releasing compounds capable of releasing cations such as magnesium, aluminum, titanium, zirconium, chromium and antimony, and compositions containing these compounds. Examples of transition metal ion releasing compounds are titanium dioxide, zirconium oxychloride, zirconium acetylacetonate, titanium citrate, titanium malate, titanium tartrate, zirconium lactate, aluminum acetate and other aluminum, titanium, zirconium, chromium and antimony chelates.

The borate releasing compound such as ulexite may be ground to a fine powder having an average particle size of 4 to 100 microns to reduce abrasiveness to pumps. The suspension composition package may contain from about 20% to about 70% weight percent of cross-linker, and preferably from about 30% to about 50% by weight.

The brine is preferably a thiosulfate compound. Without limitation, thiosulfate compounds that may be used include metal thiosulfates, such as an alkali metal thiosulfate, an alkaline earth metal thiosulfate, a transition metal thiosulfate and any combination thereof.

The brine may be sodium thiosulfate, potassium thiosulfate, magnesium thiosulfate, calcium thiosulfate, ammonium thiosulfate or combinations thereof. The aqueous suspension composition may contain from about 20% to about 70% by weight of brine and preferably from about 20% to about 50% by weight. More preferably, the thiosulfate compound includes, consists essentially of or consists entirely of sodium thiosulfate.

The typical water-soluble suspending agents that may be included in the treatment fluids described herein are particularly aqueous fluids typically comprise biopolymers, synthetic polymers, or a combination thereof, wherein the agents are at least slightly soluble in water (wherein slightly soluble means having a solubility of at least about 0.01 kg/m$^3$). Without limitation, these agents may serve to increase the viscosity of the treatment fluid during application. A variety of agents can be used in conjunction with the methods and compositions of the present inventions, including, but not limited to hydratable polymers that contain one or more functional groups such as hydroxyl, cis-hydroxyl, carboxylic acids, derivatives of carboxylic acids, sulfate, sulfonate, phosphate, phosphonate, amino or amide. The agents may also be biopolymers comprising natural, modified and derivatized polysaccharides, and derivatives thereof that contain one or more of the monosaccharide units selected from the group consisting of: galactose, mannose, glucoside, glucose, xylose, arabinose, fructose, glucuronic acid or pyranosyl sulfate. Suitable agents which may be used in accordance with the present disclosure include, but are not limited to, guar, hydroxypropyl guar, cellulose, carboxymethyl cellulose, carboxymethyl hydroxyethyl cellulose, hydroxyethylcellulose, carboxymethylhydroxypropyl guar, other derivatives of guar gum, xanthan, galactomannan gums and gums comprising galactomannans, cellulose and other cellulose derivatives, derivatives thereof, and combinations thereof, such as various carboxyalkylcellulose ethers, such as carboxyethyl cellulose; mixed ethers such as carboxyalkylethers; hydroxyalkylcelluloses such as hydroxypropylcellulose; alkylhydroxyalkylcelluloses such as hydroxypropylcellulose; alkylhydroxyalkyl celluloses such as methyhydroxypropylcellulose; alkylcelluloses such as methyl cellulose, ethylcellulose and peopylcellulose; alkylcarboxyalkylcelluloses such as methylethylcellulose; hydroxyalkylalkylcelluloses such as hydroxypropylmethylcellulose; and combinations thereof, and the like.

Preferably, in accordance with one non-limiting embodiment of the present disclosure, the agent is polyvinyl alcohol. In one embodiment, the polyvinyl alcohol is in the form of a fine powder. In the present compositions, the polyvinyl alcohol is used at very low concentration as a suspending agent for the borate cross-linker. The package may contain from about 0.1% to about 5% by weight of water-soluble suspending agent, and preferably from about 0.1% to about 2% by weight of water-soluble suspending agent. The present package may include 2 gallons of package per 100 gallon suspension that contains between 0.3-1% of polyvinyl alcohol which equates to approximately 0.2 lbs/100 gallons. By contrast, polyvinyl alcohol is conventionally known as a gelling agent when used at high concentration in a suspension. Typically when used as gelling agent, at least about 20 lbs/100 gallons of polyvinyl alcohol is necessary.

Additional natural polymers suitable for use as suspending agents in accordance with the present disclosure include, but are not limited to, locust bean gum, tara gum, konjac gum, starch, cellulose, karaya gum, xanthan gum, tragacanth gum, arabic gum, ghatti gum, tamarind gum, carrageenan and derivatives thereof. Additionally, synthetic polymers and copolymers that contain any of the above-mentioned functional groups may also be used. Examples of such synthetic polymers include but are not limited to polyacrylate, polymethacrylate, polyacrylamide, polyvinyl alcohol, maleic anhydride, methylvinyl ether copolymers and polyvinyl pyrrolidone.

The gellant is preferably guar or hydroxypropyl guar. Either underivatized guar, referred to as "guar" or derivatized guar can be used. Derivatized guars are any known in the art, for example hydroxyalkyl guar, carboxyalkyl guar, carboxyalkyl hydroxyalkyl guar, cationic guar and hydrophobically modified guar. The guar or guar derivative powders used are preferably prepared by milling guar or a guar derivative for a sufficient time so as to reduce the D50 particle size to less than 60 microns, and preferably less than 40 microns. Suitable guar powders reach at least thirty percent hydration within 60 seconds at about 70 degrees F. Preferred guar powders reach at least 50%, more preferably at least 70% hydration in 60 seconds at about 70 degrees F.

The aqueous cross-linking suspension may optionally contain from about 0.1% to about 5% by weight of boric acid.

Fracturing fluids used in embodiments of the invention may further contain other additives and chemicals. These include, but are not necessarily limited to materials such as surfactants, breakers, breaker aids, oxygen scavengers, alkaline pH adjusting agents, clay stabilizers, high temperature stabilizers, alcohols, proppant, scale inhibitors, corrosion inhibitors, fluid-loss additives, bactericides and the like.

The following examples are presented to illustrate the preparation and properties of some embodiments of the invention, and should not be construed to limit the scope of the invention, unless otherwise expressly indicated in the appended claims.

EXAMPLES

Example 1

Suspension compositions were prepared in the following manner. A sodium thiosulfate brine was made by dissolving an appropriate amount of salt in fresh water, enough to make 30% and 45% concentration, and mixing for 30 minutes on a benchtop mixer. Then an appropriate amount of water soluble polymer and optionally an appropriate amount of boric acid was added to the brine and mixed for 30 minutes. The polyvinyl alcohol used was PVOH-RS 73 S available from Riteks of McKinney, Tex. Next, an appropriate amount of ulexite available from Pan Asian Chemicals of Houston, Tex. was added and mixed for 15-20 minutes. Compositions made according to this technique are found in Table 1. Each component value listed in the table represents a weight percent. 0.3-1% of a total formulation was tested, representing roughly 1-6 polyvinyl alcohol based on sodium thiosulfate, or 0.06-3% based on ulexite. The viscosity and freezing temperature of the resultant suspension were measured. It was found that the suspensions had excellent flow properties (Fann viscosity at 510 sec$^{-1}$ of 50-200 cPs). After four weeks of storage at room temperature, no signs of phase separation were noticeable. Additionally, the suspensions showed excellent freeze/thaw stability. The freezing point for the suspensions was measured below −5° C. The results show that the presence of boric acid helps manage cross-linking time and that the higher the boric acid concentration, the lower the vortex closure time.

TABLE 1

| Ingredients | Suspension 1 | Suspension 2 | Suspension 3 | Suspension 4 | Suspension 5 |
|---|---|---|---|---|---|
| Water | 44.8 | 30.25 | 30.25 | 30.25 | 30.25 |
| Sodium Thiosulfate | 19.2 | 24.75 | 24.75 | 24.75 | 24.75 |
| Polyvinyl Alcohol | 1 | 0.3 | 0.3 | 0.3 | 0.3 |
| Boric Acid | — | — | 1 | 2 | 3 |
| Ulexite | 35 | 44.7 | 43.7 | 42.7 | 41.7 |
| Fann Viscosity after preparation @ 510 sec.$^{-1}$ | 65 | 115 | 106 | 103 | 105 |
| Freezing Temperature (° C./° F.) | −11/12.2 | −5/23 | −5/23 | −5/23 | −5/23 |

Example 2

The crosslinking efficiency of the suspensions synthesized according to Example 1 was assessed by means of "vortex closure", corresponding to the open time before the composition crosslinks and become difficult to pump. A treating fluid was prepared by hydrating 1.5 g (25 lbs/1,000 gal) of guar in 500 ml of freshwater for 30 minutes, using a Waring blender at 1,500 rpm. Once the guar was completely hydrated, the pH of the solution was determined with a standard probe. The initial guar solution had a pH of about 7.0. At that point, the pH of the guar solution was buffered to 11.0 by the addition of 0.4 ml (0.80-gal/1,000 gal) of 45% potassium hydroxide solution, and mixed for 3 minutes. When the target pH is reached, 1 ml (2 gal/1,000 gal) of a suspension of Table 1 was added to the treating fluid and the "vortex closure" time recorded as demonstrated in Table 2.

The results illustrate that vortex closure time can be controlled advantageously with appropriate cross-linker selection and cross-linker amount.

For comparison, suspensions of the present invention were tested against commercially available ulexite based crosslinker compositions that do not contain polyvinyl alcohol (compositions A and B). The conventional treatment of composition A is a liquid emulsion of ulexite and the conventional treatment of composition B is a liquid suspension of another cross-linker.

TABLE 2

| | Active Agent | | | | | | |
|---|---|---|---|---|---|---|---|
| | Suspension 1 | Suspension 2 | Suspension 3 | Suspension 4 | Suspension 5 | Comp A | Comp B |
| Vortex Closure * | >15:00 | 6:50 | 2:40 | 1:50 | 1:03 | >7:00 | 5:35 |

* = minutes:seconds (25 lbs/1000 gallons guar, pH = 11, 1-gallon per thousand XL suspension)

Example 3

Figure 2:
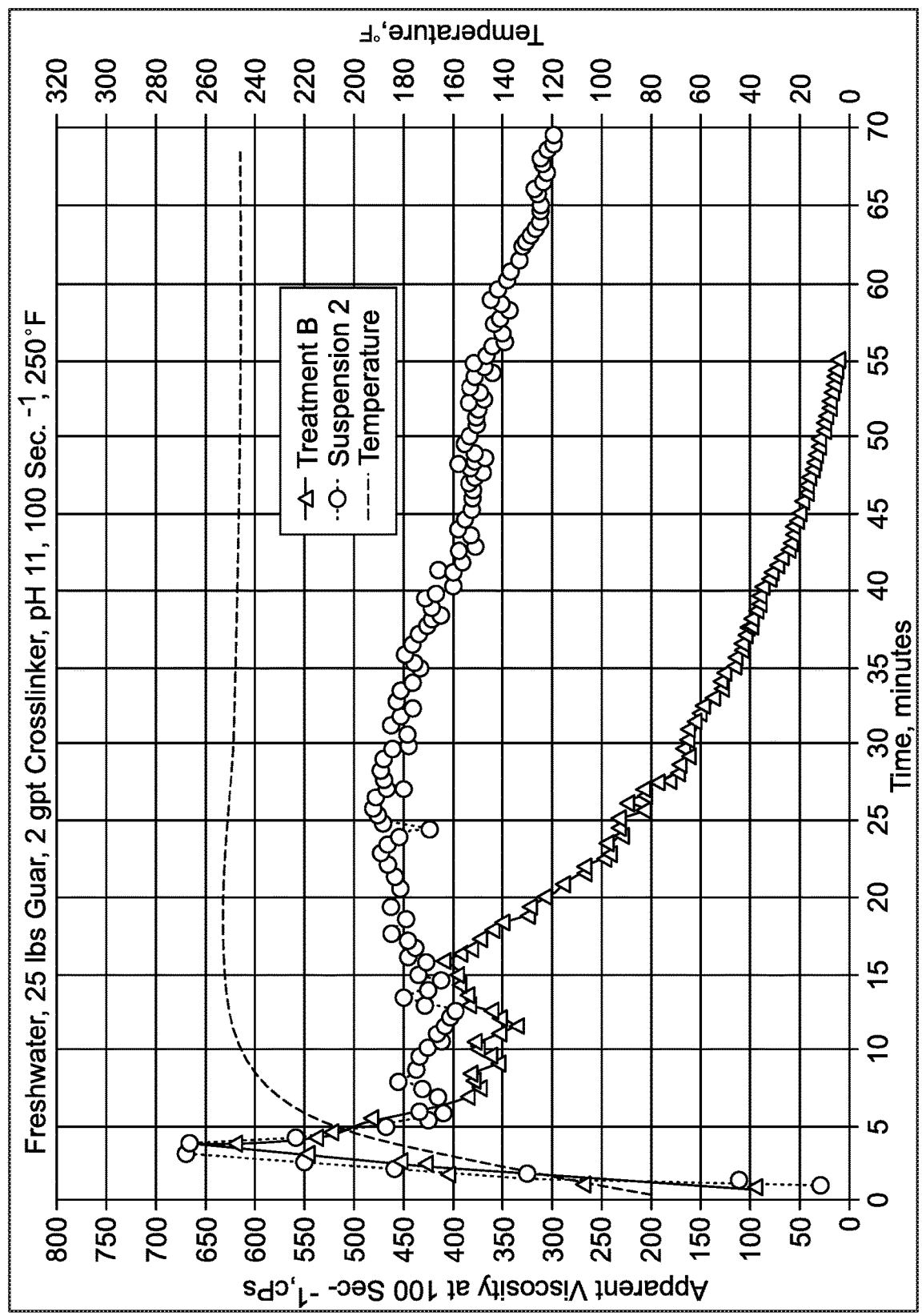
FIG. 2 is a chart comparing viscosity results of Suspension 2 to a conventional treatment, B, over time

The crosslinking efficiency of the suspensions, subject of the current invention, was further assessed in a crosslinked treating fluid at 250° F. with an HPHT viscometer. A treating fluid was prepared by hydrating 1.5 g (25-lbs/1,000 gal) of guar in 500 ml of freshwater for 30 minutes, using a Waring blender at 1,500 rpm. Once the guar was completely hydrated, the pH of the solution was determined with a standard probe. The initial guar solution had a pH of about 7.0. At that point, the pH of the guar solution was buffered to 11.0 by the addition of 0.4 ml (0.80-gal/1,000 gal) of 45% potassium hydroxide solution. When the target pH was reached, 1 ml (2-gal/1,000 gal) of a suspension of Table 1 was added and mixed for 30 seconds. Immediately, a volume of 50 ml of the treating fluid was transferred into a HPHT viscometer cup (Grace M5600) and the test was started under pre-set conditions of temperature (250° F.) and shear rate (100 sec.$^{-1}$), following standard procedure. The apparent viscosity profile versus time was recorded over 60 minutes, or until the viscosity drops below 50 cPs. The results of the comparative test of Suspension 1 to composition A are shown in FIG. 1 and the results of the comparative test of Suspension 1 to composition B are shown in FIG. 2. In each comparison, the suspension composition of the present invention resulted in a more stable viscosity.

It is understood that modifications to the invention may be made as might occur to one skilled in the field of the invention within the scope of the appended claims. All embodiments contemplated hereunder which achieve the objects of the invention have not been shown in compete detail. Other embodiments may be developed without departing from the spirit of the invention or from the scope of the appended claims. Although the present invention has been described with respect to specific details, it is not intended that such details should be regarded as limitations on the scope of the invention, except to the extent that they are included in the accompanying claims.

We claim:

1. A method for fracturing a subterranean formation having a downhole temperature ranging from about 65° F. to about 350° F. with a fracturing fluid containing a gellant comprising the steps of:

a) preparing an aqueous cross-linking suspension composition of 20-70 weight percent sodium thiosulfate, 0.1-5 weight percent boric acid, 0.1-5 weight percent of water soluble suspending agent and 20-70 weight percent ulexite;

b) treating a fracturing fluid containing said gellant with said aqueous cross-linking suspension composition to form a treated gellant-containing fracturing fluid, thereby enhancing thermal stability of said fracturing fluid containing gellant; and then c) contacting the treated gellant-containing fracturing fluid and at least a portion of said subterranean formation at pressures sufficient to form fractures in said formation, wherein said water-soluble suspending agent is a cellulose ether selected from the group consisting of: carboxymethyl cellulose, methyl cellulose, hydroxyethyl cellulose, carboxymethyl hydroxyethyl cellulose, methyl hydroxyethyl cellulose, hydroxypropyl cellulose and combinations thereof.

2. The method of claim 1 wherein said gellant is guar.

3. A method for efficiently delivering borate-based cross-linkers for fracturing a subterranean formation having a downhole temperature ranging from about 65° F. to about 350° F. with a fracturing fluid containing a gellant comprising the steps of:
   a) preparing an aqueous cross-linking suspension package comprising 20-70 weight percent sodium thiosulfate, 0.1-5 weight percent boric acid, 0.1-5 weight percent of water-soluble suspending agent and 20-70 weight percent ulexite;
   b) treating a fracturing fluid containing said gellant with said aqueous cross-linking suspension package to form a treated gellant-containing fracturing fluid; and then
   c) contacting the treated gellant-containing fracturing fluid and at least a portion of said subterranean formation at pressures sufficient to form fractures in said formation,
   wherein said water-soluble suspending agent is a cellulose ether selected from the group consisting of: carboxymethyl cellulose, methyl cellulose, hydroxyethyl cellulose, carboxymethyl hydroxyethyl cellulose, methyl hydroxyethyl cellulose, hydroxypropyl cellulose and combinations thereof.

4. The method of claim 3 wherein said gellant is guar.

5. A method for fracturing a subterranean formation having a downhole temperature ranging from about 65° F. to about 350° F. with a fracturing fluid containing a gellant comprising the steps of:
   a) preparing an aqueous cross-linking suspension composition of 20-70 weight percent sodium thiosulfate, 0.1-5 weight percent boric acid, 0.1-5 weight percent of water soluble suspending agent and 20-70 weight percent ulexite;
   b) treating a fracturing fluid containing said gellant with said aqueous cross-linking suspension composition to form a treated gellant-containing fracturing fluid, thereby enhancing thermal stability of said fracturing fluid containing gellant; and then
   c) contacting the treated gellant-containing fracturing fluid and at least a portion of said subterranean formation at pressures sufficient to form fractures in said formation,
   wherein said water-soluble suspending agent is polyvinyl alcohol.

6. The method of claim 5 wherein said gellant is guar.

\* \* \* \* \*